United States Patent
Chu et al.

(10) Patent No.: US 10,986,600 B1
(45) Date of Patent: Apr. 20, 2021

(54) TIMING SYNCHRONIZATION FOR MULTI-USER (MU) RANGING MEASUREMENTS IN A WIRELESS LOCAL AREA NETWORK (WLAN)

(71) Applicant: NXP USA, Inc., Austin, TX (US)

(72) Inventors: Liwen Chu, San Ramon, CA (US); Christian Berger, San Jose, CA (US); Niranjan Grandhe, San Jose, CA (US); Hongyuan Zhang, Fremont, CA (US); Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 58 days.

(21) Appl. No.: 16/704,576

(22) Filed: Dec. 5, 2019

Related U.S. Application Data

(60) Provisional application No. 62/831,586, filed on Apr. 9, 2019, provisional application No. 62/795,437, filed
(Continued)

(51) Int. Cl.
*H04W 36/00* (2009.01)
*H04W 56/00* (2009.01)
(Continued)

(52) U.S. Cl.
CPC ......... *H04W 56/0055* (2013.01); *G01S 5/021* (2013.01); *G01S 5/14* (2013.01);
(Continued)

(58) Field of Classification Search
CPC ...... H04B 2201/71634; H04W 36/0077; H04J 3/0682; H04J 7/048; H04J 3/0635;
(Continued)

(56) References Cited

U.S. PATENT DOCUMENTS

| 10,641,887 B1 * | 5/2020 | Chu ............... H04W 40/02 |
| 2005/0026563 A1 | 2/2005 | Leeper et al. |

(Continued)

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

(Continued)

*Primary Examiner* — Rafael Pérez-Gutiérrez
*Assistant Examiner* — Xiang Zhang

(57) ABSTRACT

A first communication device generates a first ranging frame for transmission to a set of second communication devices, and transmitting the first ranging frame during an multi-user (MU) ranging measurement procedure for estimating respective distances between respective second communication devices, among the set of second communication devices, and the first communication device based on measuring times of flight of transmissions between the first communication device and the respective second communication devices. The first communication device then generates a second ranging frame to include timing information corresponding to transmission of the first ranging frame, the timing information indicative of a time of transmission of the first ranging frame by the first communication device. The first communication device transmits the second ranging frame during the MU ranging measurement procedure to second communication devices to permit the second communication devices to synchronize ranging measurement timing with the first communication device.

22 Claims, 10 Drawing Sheets

Related U.S. Application Data on Jan. 22, 2019, provisional application No. 62/775,730, filed on Dec. 5, 2018.

(51) Int. Cl.
| | |
|---|---|
| *H04W 4/02* | (2018.01) |
| *H04W 4/029* | (2018.01) |
| *G01S 5/02* | (2010.01) |
| *G01S 11/08* | (2006.01) |
| *G01S 5/14* | (2006.01) |

(52) U.S. Cl.
CPC ............ *G01S 11/08* (2013.01); *H04W 4/023* (2013.01); *H04W 4/029* (2018.02)

(58) Field of Classification Search
CPC ....... H04L 7/048; H04L 27/2655; H04L 7/00; H04L 7/002; H04L 25/4904
See application file for complete search history.

(56) References Cited

U.S. PATENT DOCUMENTS

| | | | | |
|---|---|---|---|---|
| 2016/0150500 | A1* | 5/2016 | Agrawal | ............... H04L 5/0007 |
| | | | | 370/329 |
| 2016/0241373 | A1* | 8/2016 | Marri Sridhar | ....... H04L 5/0055 |
| 2016/0323879 | A1 | 11/2016 | Ghosh et al. | |
| 2016/0345277 | A1* | 11/2016 | Segev | ................. H04W 56/001 |
| 2016/0366660 | A1* | 12/2016 | Segev | ............... H04W 56/0045 |
| 2017/0230969 | A1* | 8/2017 | Aldana | .................... H04W 4/70 |
| 2017/0280343 | A1* | 9/2017 | Chu | ...................... H04W 24/10 |
| 2018/0027561 | A1 | 1/2018 | Segev et al. | |
| 2019/0014466 | A1* | 1/2019 | Seok | ...................... H04W 12/04 |
| 2019/0014491 | A1* | 1/2019 | Seok | ........................ H04L 63/12 |

OTHER PUBLICATIONS

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

IEEE Std 802.11-REVmc™/D8.0, Aug. 2016, "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. i-civ, 291-294, 336-341, 387-389, 771-773, 819-821, 858-865, 901-903, 1062-1066, 1158-1161, 1552-1571, 1703-1707, 1740, 1741, 1765-1775, 2193, 2194, 3601, 3602 (Aug. 2016).

Zhu et al., "IEEE P802.11, Wireless LANs, Proposed 802.11az Functional Requirements," *Institute of Electrical and Electronics Engineers*, doc. IEEE 802.11-16/0424r4, 6 pages (Mar. 13, 2017).

* cited by examiner

| AID11 630-1 | Partial BW Info 630-2 | Feedback Type and Ng 630-3 | Disambiguation 630-4 | Codebook Size 630-5 | Nc 630-6 |
|---|---|---|---|---|---|
| B0 ... B10 | B11 ... B24 | B25 B26 | B27 | B28 | B29 ... B31 |

| Bits: | B0 B10 | B11 B26 | B27 | B28 | B29 B31 |
|---|---|---|---|---|---|
| | AID11 640-1 | Partial TSF 640-2 | Disambiguation 640-3 | Reserved 640-4 | Token 640-5 |

TIMING SYNCHRONIZATION FOR MULTI-USER (MU) RANGING MEASUREMENTS IN A WIRELESS LOCAL AREA NETWORK (WLAN)

CROSS REFERENCES TO RELATED APPLICATIONS

This application claims the benefit of U.S. Provisional Patent Application No. 62/775,730, entitled "Timing Synchronization Function (TSF) in Multi-User (MU) Null Data Packet (NDP) Ranging," filed on Dec. 5, 2018, U.S. Provisional Patent Application No. 62/795,437, entitled "Timing Synchronization Function (TSF) in Multi-User (MU) Null Data Packet (NDP) Ranging," filed on Jan. 22, 2019, and U.S. Provisional Patent Application No. 62/831,586, entitled "Timing Synchronization Function (TSF) in Multi-User (MU) Null Data Packet (NDP) Ranging," filed on Apr. 9, 2019, the disclosures of each of which are incorporated herein by reference in their entireties.

FIELD OF TECHNOLOGY

The present disclosure relates generally to wireless communication systems, and more particularly to communication exchanges between wireless communication devices for ranging measurements among the wireless communication devices.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some mobile communication devices include a WLAN network interface and satellite positioning technology, such as global positioning system (GPS) technology. GPS technology in mobile communication devices is useful for navigating to a desired location, for example. However, GPS technology does not typically provide accurate location information when a GPS receiver is not in direct sight of a GPS satellite, and thus GPS technology is often not useful for providing location information while a mobile communication device is within a building such as an airport, a shopping mall, etc., within a tunnel, etc.

Techniques for determining a position of a communication device using WLAN technology are now under development. For example, a distance between a first communication and a second communication device is determined by measuring a time of flight of WLAN transmissions between the first communication device and the second communication device, and the distance is determined based on the measured time of flight. Similarly, distances between the first communication device and multiple third communication devices are determined. Then, the determined distances are used to estimate a location of the first communication device by employing, for example, a triangulation technique. For a first communication device having multiple antennas, an angle of departure (AoD) of a WLAN transmission can be determined. Similarly, for a second communication device having multiple antennas, an angle of arrival (AoA) of the WLAN transmission from the first communication device can be determined. The AoD and the AoA, along with the determined distances, can be also be used for estimating the location of the first communication device.

In some systems, multi-user (MU) ranging measurement procedures are performed with a set of communication devices during scheduled service periods (SPs). In such systems, communication devices that are scheduled to participate in an MU ranging measurement procedure during an SP need to be able to accurately determine a time corresponding to a beginning of the SP.

SUMMARY

In an embodiment, a method for performing time synchronization for multi-user (MU) ranging measurements in a wireless local area network (WLAN) includes: generating, at a first communication device, a first ranging frame for transmission to a set of second communication devices; transmitting, by the first communication device, the first ranging frame during an MU ranging measurement procedure, the MU ranging measurement procedure for estimating respective distances between respective second communication devices, among the set of second communication devices, and the first communication device based on measuring times of flight of transmissions between the first communication device and the respective second communication devices; generating, at the first communication device, a second ranging frame to include timing information corresponding to transmission of the first ranging frame, the timing information indicative of a time of transmission of the first ranging frame by the first communication device; and transmitting, by the first communication device, the second ranging frame during the MU ranging measurement procedure to second communication devices, among the set of second communication devices, to permit the second communication devices to synchronize ranging measurement timing with the first communication device.

In another embodiment, an apparatus comprises a network interface device associated with a first communication device, wherein the network interface device includes one or more integrated circuit (IC) devices, and wherein the one or more IC devices are configured to: generate a first ranging frame for transmission to a set of second communication devices; transmit the first ranging frame during a multi-user (MU) ranging measurement procedure, the MU ranging measurement procedure for estimating respective distances between respective second communication devices, among the set of second communication devices, and the first communication device based on measuring times of flight of transmissions between the first communication device and the respective second communication devices; generate a second ranging frame to include timing information corresponding to transmission of the first ranging frame, the timing information indicative of a time of transmission of the first ranging frame by the first communication device; and transmit the second ranging frame during the MU ranging measurement procedure to second communication devices, among the set of second communication devices, to permit the second communication devices to synchronize ranging measurement timing with the first communication device.

BRIEF DESCRIPTION OF THE DRAWINGS

FIG. 6B is a diagram of an example user information field of the NDPA frame of FIG. 6A, according to an embodiment.

FIG. 6C is a diagram of a user information field used for ranging timing synchronization information in the NDPA frame of FIG. 6A, according to an embodiment.

DETAILED DESCRIPTION

In embodiments described below, a first communication device, such as an access point (AP) in a WLAN, conducts a multi-user (MU) ranging measurement procedure with a set of second communication devices, such as a set of client stations in the WLAN. In an embodiment, the MU ranging measurement procedure is conducted with the set of client stations periodically, such as during a plurality of scheduled service periods (SP). In an embodiment, the AP schedules SPs for the MU ranging measurement procedure, and indicates a time interval between the SPs to the set of client stations so that the client stations are ready for the MU ranging measurement procedure at the beginning of each of the SPs. However, if timing used by a client station for determining a time of the beginning of an SP is not synchronized with timing used by the AP for determining the time of the beginning of the SP, the client station may not be ready for the MU ranging measurement procedure at the appropriate time. Timing synchronization techniques described herein allow the client stations to synchronize timing for ranging measurements with the AP and to accurately determine a time of the beginning of each SP for ranging measurements with the AP, in various embodiments.

Ranging measurement procedures and techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, ranging measurement procedures and techniques are utilized in other types of wireless communication systems such as personal area networks (PANs), mobile communication networks such as cellular networks, metropolitan area networks (MANs), etc.

Figure 1:
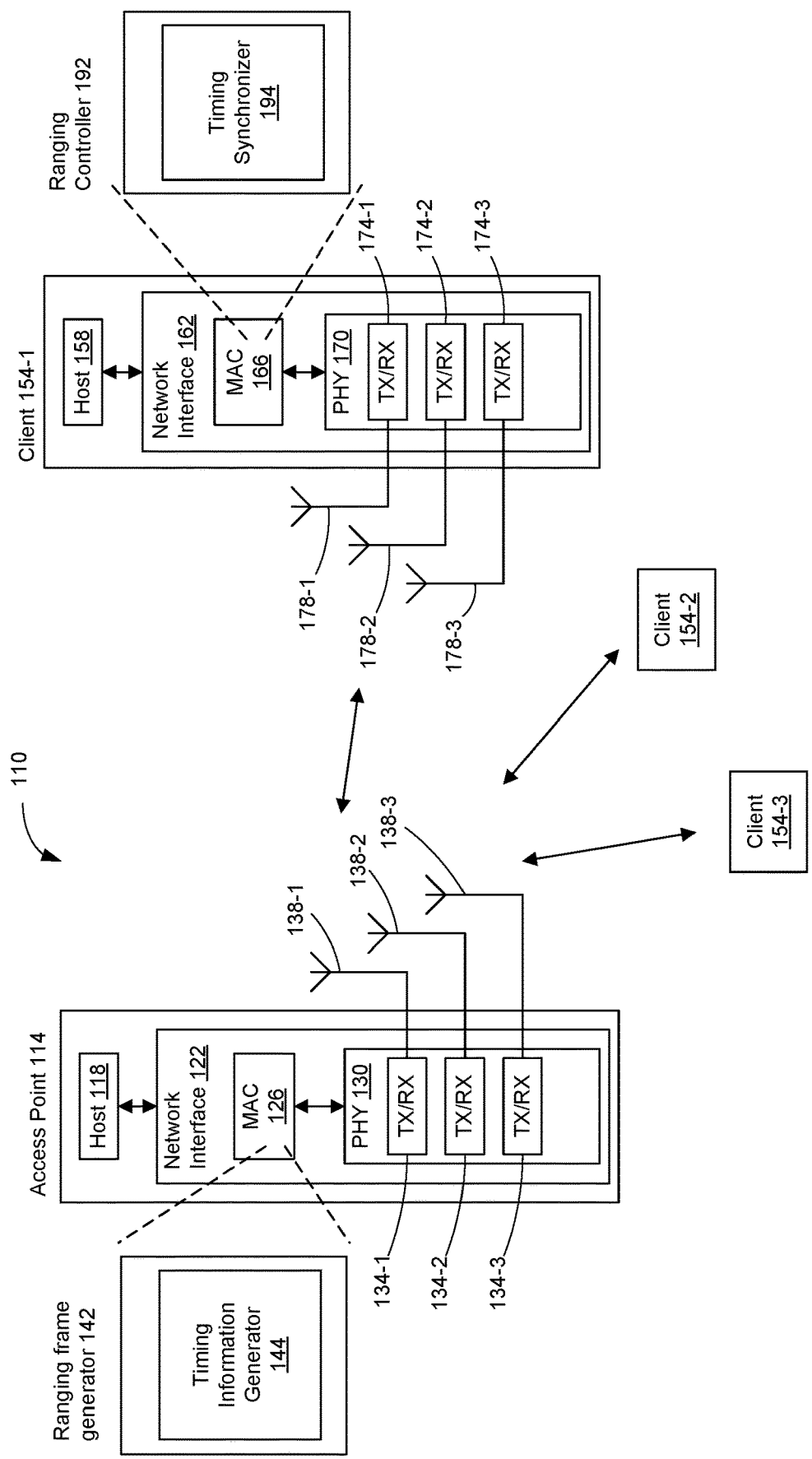
FIG. 1 is a block diagram of an example wireless local area network (WLAN) in which timing synchronization techniques for ranging measurements described herein may be utilized, according to an embodiment.

FIG. 1 is a block diagram of an example WLAN 110 in which timing synchronization techniques described herein may be utilized, according to an embodiment. The WLAN 110 includes an access point (AP) 114 that comprises a host processor 118 coupled to a network interface device 122. The network interface 122 includes a media access control (MAC) layer processor 126 (referred to as a "MAC processor") and a PHY processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MPDUs, A-MPDUs, etc., and provide the MAC layer data units to the PHY processor 130.

In an embodiment, the MAC processor 126 includes a padding unit that is configured to determine a number of padding bits to be added to an MPDU, and to add the determined number of padding bits to the MPDU. In an embodiment, the padding unit comprises a logic circuit that is configured to determine the number of padding bits to be added to the MPDU, and/or to add the determined number of padding bits to the MPDU. In an embodiment, the padding unit is implemented at least partially by a processor of the MAC processor 126, wherein the processor executes machine readable instructions that, when executed by the processor, cause the processor to determine the number of padding bits to be added to the MPDU, and/or to add the determined number of padding bits to the MPDU, and/or control a logic circuit of the MAC processor 126 to add the determined number of padding bits to the MPDU.

The PHY processor 130 is configured to receive MAC layer data units from the MAC processor 126 and encapsulate the MAC layer data units to generate PHY data units such as PHY protocol data units (PPDUs), PHY protocol service data units (PSDUs), etc., for transmission via the antennas 138. Similarly, the PHY processor 130 is configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In an embodiment, the PHY processor 130 includes one or more forward error correction (FEC) encoders that are configured to encode bits in a MAC layer data unit according to one or more FEC coding schemes. For example, the PHY processor 130 includes a binary convolutional code (BCC) encoder, according to an embodiment. As another example, the PHY processor 130 additionally or alternatively includes a low density parity check (LDPC) encoder, according to another embodiment. In an embodiment, the FEC encoder comprises a logic circuit that is configured to encode bits in a MAC layer data unit according to an FEC coding scheme. In an embodiment, the FEC encoder is implemented at least partially by a processor of the PHY processor 130, wherein the processor executes machine readable instructions that, when executed by the processor, cause the processor to encode bits in a MAC layer data unit according to an FEC coding scheme.

Similarly, in an embodiment, the PHY processor 130 includes one or more FEC decoders that are configured to decode bits in a PHY data unit according to one or more FEC coding schemes. For example, the PHY processor 130 includes a BCC decoder, according to an embodiment. As another example, the PHY processor 130 additionally or alternatively includes an LDPC decoder, according to another embodiment. In an embodiment, the FEC decoder comprises a logic circuit that is configured to decode bits in a PHY data unit according to an FEC coding scheme. In an embodiment, the FEC decoder is implemented at least partially by a processor of the PHY processor 130, wherein the processor executes machine readable instructions that, when executed by the processor, cause the processor to decode bits in a PHY data unit according to an FEC coding scheme.

In an embodiment, the PHY processor 130 includes a padding unit that is configured to determine a number of padding bits to be added to a PHY data unit, and to add the determined number of padding bits to the PHY data unit. In an embodiment, some padding bits are added to the PHY data unit prior to the PHY processor 130 performing FEC encoding of the PHY data unit, and some padding bits are added to the PHY data unit after the PHY processor 130 performs FEC encoding of the PHY data unit. Accordingly, the padding unit is configured to determine a first number of padding bits to be added to a PHY data unit prior to performing FEC encoding of the PHY data unit, and to determine a second number of padding bits to be added to the PHY data unit after performing FEC encoding of the PHY data unit, in an embodiment.

In an embodiment, the padding unit comprises a logic circuit that is configured to determine the number of padding bits to be added to the PHY data unit, and/or to add the determined number of padding bits to the PHY data unit. In an embodiment, the padding unit is implemented at least partially by a processor of the PHY processor 130, wherein the processor executes machine readable instructions that, when executed by the processor, cause the processor to determine the number of padding bits to be added to the PHY data unit, and/or to add the determined number of padding bits to the PHY data unit, and/or control a logic circuit of the PHY processor 130 to add the determined number of padding bits to the PHY data unit.

In various embodiments, the MAC processor 126 is configured to generate and process MAC layer data units such as described herein. In various embodiments, the PHY processor 130 is configured to generate and process PHY data units such as described herein.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine that is configured to perform MAC layer functions, control the PHY processor 130, etc.

In an embodiment, the MAC processor 126 includes a ranging frame generator 142 configured to generate ranging frames that include timing information for ranging measurement timing synchronization, according to an embodiment. The ranging frame generator 142 includes a timing information generator 144 that is configured to generate timing information to be included in ranging frames, in an embodiment. The ranging frame generator 142 is configured to generate a first ranging frame, and to cause the first ranging frame to be transmitted by the AP 114 to one or more other communication devices (e.g., client stations) during a ranging measurement SP, in an embodiment. The timing information generator 144 is configured to generate timing information corresponding to transmission of the first ranging frame from the AP 114, in an embodiment. The timing information includes, for example, information indicative of a time at which the first ranging frame was transmitted by the AP 114. In an embodiment, the timing information also includes an identifier (e.g., a token) identifying the first ranging frame. The ranging frame generator 142 is configured to generate a second ranging frame to include the timing information generated by the timing information generator 144, and to cause the second ranging frame to be transmitted by the AP 114 to the one or more client stations during the SP to enable the one or more client stations to synchronize timing for ranging measurements with the AP 114. In an embodiment, a client station synchronizes timing for ranging measurements with the AP 114 based on timing information corresponding to receipt of the first ranging frame at the client station and the timing information included in the second ranging frame.

In an embodiment, the ranging frame generator 142 is implemented by a processor configured to execute machine readable instructions stored in a memory device (not shown) such as a RAM, a ROM, a flash memory, etc. In an embodiment, the ranging frame generator 142 additionally or alternatively includes a hardware state machine that is configured to generate ranging frames that include timing information such as described herein. Similarly, the timing information generator 144 is implemented by a processor configured to execute machine readable instructions stored in a memory device (not shown) such as a RAM, a ROM, a flash memory, etc., in an embodiment. In an embodiment, the timing information generator 144 additionally or alternatively includes a hardware state machine that is configured to generate timing information for ranging measurement timing synchronization such as described herein.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, A-MPDUs, etc., and provide the MAC layer data units to the PHY processor 170.

In an embodiment, the MAC processor 166 includes a padding unit that is configured to determine a number of padding bits to be added to an MPDU, and to add the determined number of padding bits to the MPDU. In an embodiment, the padding unit comprises a logic circuit that is configured to determine the number of padding bits to be added to the MPDU, and/or to add the determined number of padding bits to the MPDU. In an embodiment, the padding unit is implemented at least partially by a processor of the MAC processor 166, wherein the processor executes machine readable instructions that, when executed by the processor, cause the processor to determine the number of padding bits to be added to the MPDU, and/or to add the determined number of padding bits to the MPDU, and/or control a logic circuit of the MAC processor 166 to add the determined number of padding bits to the MPDU.

The PHY processor 170 is configured to receive MAC layer data units from the MAC processor 166 and encapsulate the MAC layer data units to generate PHY data units such as PPDUs, PSDUs, etc., for transmission via the antennas 178. Similarly, the PHY processor 170 is configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

In an embodiment, the PHY processor 170 includes one or more FEC encoders that are configured to encode bits in a MAC layer data unit according to one or more FEC coding schemes. For example, the PHY processor 170 includes a BCC encoder, according to an embodiment. As another example, the PHY processor 170 additionally or alternatively includes an LDPC encoder, according to another embodiment. In an embodiment, the FEC encoder comprises a logic circuit that is configured to encode bits in a MAC layer data unit according to an FEC coding scheme. In an embodiment, the FEC encoder is implemented at least partially by a processor of the PHY processor 170, wherein the processor executes machine readable instructions that, when executed by the processor, cause the processor to encode bits in a MAC layer data unit according to an FEC coding scheme.

Similarly, in an embodiment, the PHY processor 170 includes one or more FEC decoders that are configured to decode bits in a PHY data unit according to one or more FEC coding schemes. For example, the PHY processor 170 includes a BCC decoder, according to an embodiment. As another example, the PHY processor 130 additionally or alternatively includes an LDPC decoder, according to another embodiment. In an embodiment, the FEC decoder comprises a logic circuit that is configured to decode bits in a PHY data unit according to an FEC coding scheme. In an embodiment, the FEC decoder is implemented at least partially by a processor of the PHY processor 170, wherein the processor executes machine readable instructions that, when executed by the processor, cause the processor to decode bits in a PHY data unit according to an FEC coding scheme.

In an embodiment, the PHY processor 170 includes a padding unit that is configured to determine a number of padding bits to be added to a PHY data unit, and to add the determined number of padding bits to the PHY data unit. In an embodiment, some padding bits are added to the PHY data unit prior to the PHY processor 170 performing FEC encoding of the PHY data unit, and some padding bits are added to the PHY data unit after the PHY processor 170 performs FEC encoding of the PHY data unit. Accordingly, the padding unit is configured to determine a first number of padding bits to be added to a PHY data unit prior to performing FEC encoding of the PHY data unit, and to determine a second number of padding bits to be added to the PHY data unit after performing FEC encoding of the PHY data unit, in an embodiment.

In an embodiment, the padding unit comprises a logic circuit that is configured to determine the number of padding bits to be added to the PHY data unit, and/or to add the determined number of padding bits to the PHY data unit. In an embodiment, the padding unit is implemented at least partially by a processor of the PHY processor 170, wherein the processor executes machine readable instructions that, when executed by the processor, cause the processor to determine the number of padding bits to be added to the PHY data unit, and/or to add the determined number of padding bits to the PHY data unit, and/or control a logic circuit of the PHY processor 170 to add the determined number of padding bits to the PHY data unit.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine that is configured to perform MAC layer functions, control the PHY processor 170, etc.

In an embodiment, the MAC processor 166 includes a ranging controller 192 that is configured to control operation of the network interface device 162 in connection with ranging measurements. The ranging controller 192 includes a timing synchronizer 194 that is configured to perform ranging timing synchronization operations, in an embodiment. In an embodiment, the timing synchronizer 194 is configured to record timing information corresponding to reception of a first ranging frame during a ranging measurement service period from the AP 114. The timing synchronizer 194 is also configured to process timing information included in a second ranging frame received by the client station 154-1 from the AP 114 during the ranging measurement service period. The timing information includes, for example, information indicative of the time, recorded at the AP 114, at which the first ranging frame was transmitted by the AP 114. In an embodiment, the timing information also includes an identifier (e.g., a token) identifying the first ranging frame. The timing synchronizer 194 is configured to synchronize timing of the client station 154-1 for ranging measurements with the AP 114 based on timing information indicative of a time, recoded at the client station 154-1, at which the first ranging frame was received at the client station 154-1 and the timing information included in the second ranging frame received from the AP 114, in an embodiment. In an embodiment, the timing synchronizer 194 synchronize timing of the client station 154-1 for ranging measurements with the AP 114 based on a difference between the time, recorded at the AP 114, at which the first ranging frame was transmitted by the AP 114 and the time, recorded at the client station 154-1, at which the first ranging frame was received at the client station 154-1. The ranging controller 192 is configured to use synchronized timing to accurately determine a beginning of at least one subsequent ranging service period in which the client station 154-1 is scheduled to participate with the AP 114, in an embodiment.

In an embodiment, the ranging controller 192 is implemented by a processor configured to execute machine readable instructions stored in a memory device (not shown) such as a RAM, a ROM, a flash memory, etc. In an embodiment, the ranging controller 192 additionally or alternatively includes a hardware state machine that is configured to control operation of the network interface device 162 in connection with ranging measurements such as described herein. Similarly, the timing synchronizer 194 is implemented by a processor configured to execute machine readable instructions stored in a memory device (not shown) such as a RAM, a ROM, a flash memory, etc., in an embodiment. In an embodiment, the timing synchronizer 194 additionally or alternatively includes a hardware state machine that is configured to perform timing synchronization operations such as described herein.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
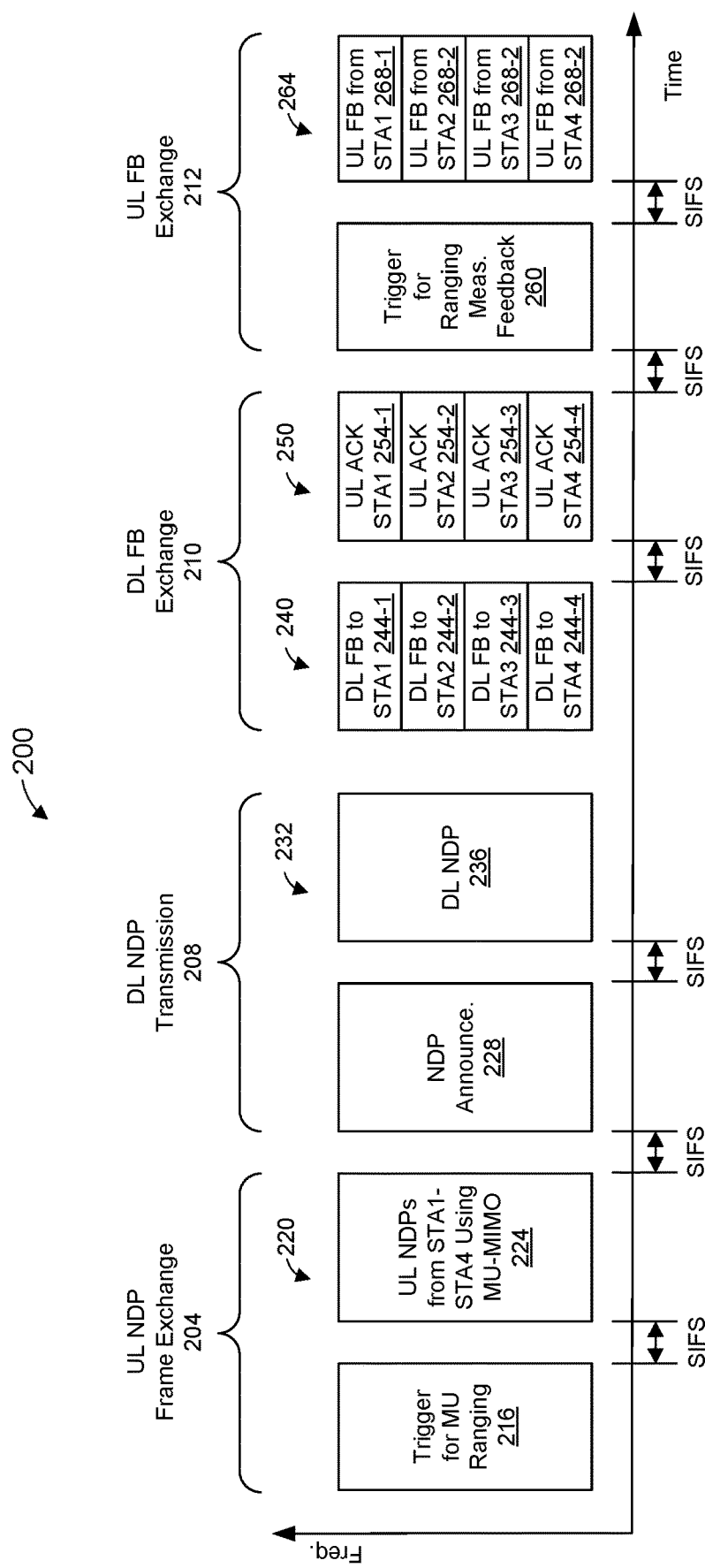
FIG. 2A is a diagram of an example multi-user (MU) ranging measurement exchange in an MU ranging measurement procedure performed in the WLAN of FIG. 1, according to an embodiment.

FIG. 2A is a diagram of an example multi-user (MU) ranging measurement exchange 200 in an MU ranging measurement procedure, according to an embodiment. The MU ranging measurement exchange 200 is a trigger-based (TB) null data packet (NDP) ranging procedure, in an embodiment. The diagram 200 is described in the context of the example network 110 of FIG. 1 merely for explanatory purposes. In some embodiments, signals illustrated in FIG. 2A are generated by other suitable communication devices and/or in other suitable types of wireless networks.

The MU ranging measurement exchange 200 corresponds to an AP-initiated MU ranging measurement exchange, according to an embodiment. The MU ranging measurement exchange 200 includes an uplink (UL) NDP frame exchange 204, a downlink (DL) NDP transmission portion 208, a DL feedback (FB) frame exchange 210, and an UL FB frame exchange 212. In an embodiment, the uplink UL NDP frame exchange 204, the DL NDP transmission portion 208, the DL FB frame exchange 210, and the UL FB frame exchange 212 occur within a single transmit opportunity (TXOP). In another embodiment, the uplink UL NDP frame exchange 204, the DL NDP transmission portion 208, the DL FB frame exchange 210, and the UL FB frame exchange 212 do not occur within a single TXOP. For example, the uplink UL NDP frame exchange 204 and the DL NDP transmission portion 208 occur within a single TXOP, whereas the DL FB frame exchange 210 and the UL FB frame exchange 212 occur after the single TXOP (e.g., in another TXOP or in multiple other TXOPs).

In the UL NDP exchange 204, a first communication device (e.g., the AP 114) transmits a DL PPDU 216 that includes a trigger frame to cause a group of multiple second communication devices (e.g., client stations 154) to simultaneously transmit, as part of an uplink (UL) MU transmission 220, UL null data packets (NDPs) 224. In an embodiment, the trigger frame in the PPDU 216 is a type of trigger frame specifically for initiating an MU ranging measurement exchange such as the MU ranging measurement exchange 200. The trigger frame in the PPDU 216 causes multiple client stations 154 to begin simultaneously transmitting the UL MU transmission 220 a defined time period after an end of the PPDU 216. In an embodiment, the defined time period is a short interframe space (SIFS) as defined by the IEEE 802.11 Standard. In other embodiments, another suitable time period is utilized.

In an embodiment, the UL MU transmission 220 includes an UL MU multiple input, multiple output (MIMO) transmission having two or more UL NDPs 224 from multiple client stations 154, e.g., STA1, STA2, STA3, and STA4. The two or more of the UL NDPs 224 are transmitted within a same frequency band via different spatial streams (e.g., MU-MIMO). In another embodiment, the UL MU transmission 220 includes an UL orthogonal frequency division multiple access (OFDMA) transmission having two or more UL NDPs 224 from multiple client stations 154, e.g., STA1, STA2, STA3, and STA4, in different respective frequency bandwidth portions. In yet another embodiment, three or more UL NDP packets 224 transmitted using a combination of UL MU-MIMO and UL OFDMA, where at least two NDPs are transmitted using MU-MIMO in a same frequency bandwidth portion via different spatial streams, and at least one NDP is transmitted in at least one other different frequency bandwidth portion. The UL NDPs 224 include PHY preambles having one or more short training fields (STFs), one or more long training fields (LTFs) and one or more signal fields, in an embodiment. In an embodiment, each PHY preamble of each UL NDP 224 includes i) a legacy portion having a legacy STF (L-STF), a legacy LTF (L-LTF), and a legacy signal field (L-SIG), and ii) a non-legacy portion having a high efficiency WiFi STF (HE-STF), one or more high efficiency WiFi LTFs (HE-LTFs), and a high efficiency WiFi signal field (HE-SIG). The UL NDPs 224 omit data portions.

When transmitting the UL NDPs 224, each client station 154 records a time $t_{1,k}$ at which the client station 154 began transmitting a particular portion of the UL NDP 224 (e.g., a first occurring HE-LTF in the UL NDP 224), where k is an index indicating the particular client station 154. Similarly, when the AP 114 receives each UL NDP 224, the AP 114 records a time $t_{2,k}$ at which the AP 114 began receiving the particular portion of the UL NDP 224 (e.g., the first occurring HE-LTF in the UL NDP 224).

In some embodiments, when transmitting the UL NDPs 224, each of at least some of the client stations 154 (e.g., client stations 154 with multiple antennas 174) records an angle of departure, $AoD_{1,k}$, at which the UL NDP 224 left the antennas 178 of the client station 154. Similarly, when the AP 114 receives each UL NDP 224, the AP 114 records an angle of arrival, $AoA_{1,k}$, at which the UL NDP 224 arrived at the antennas 138 of the AP 114.

Figure 2B:
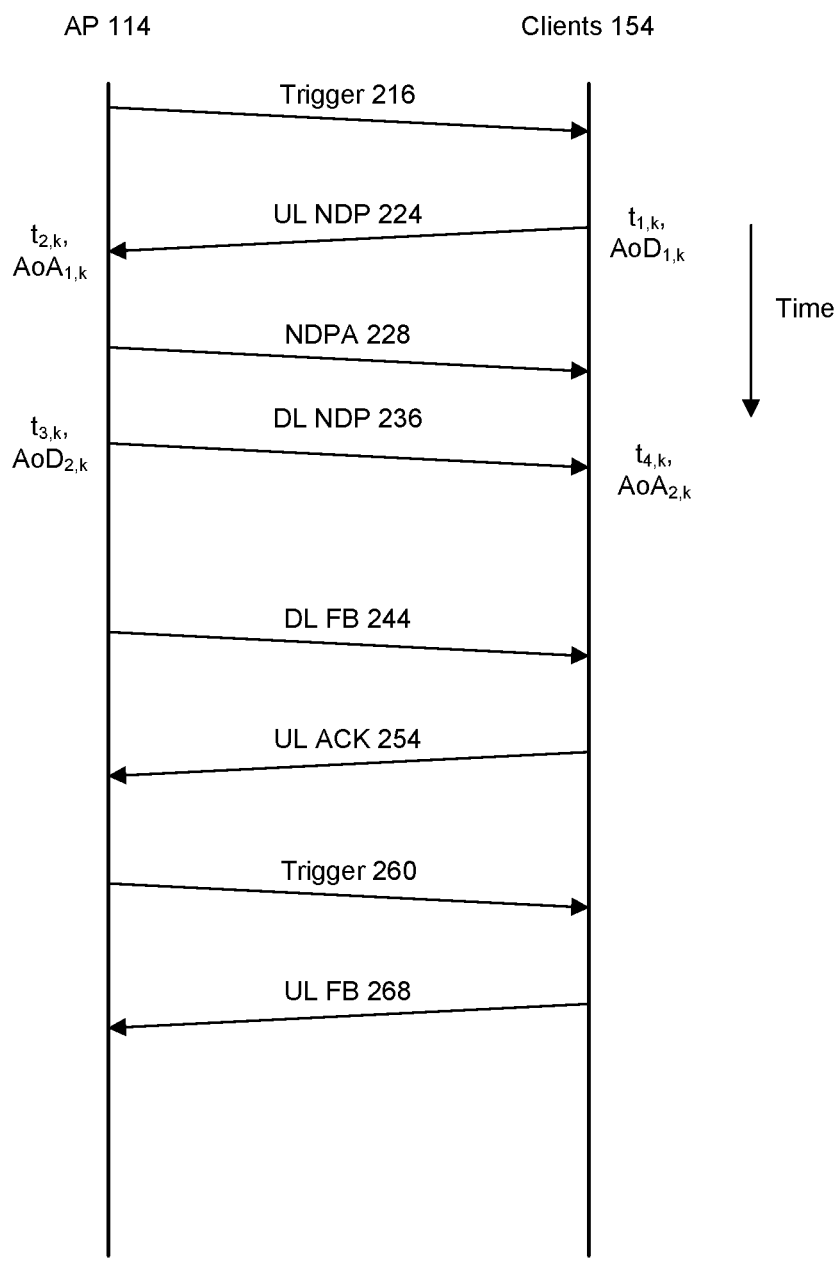
FIG. 2B is a timing diagram of the example MU ranging measurement exchange of FIG. 2A, according to an embodiment.

FIG. 2B is a timing diagram of the example MU ranging measurement exchange 200 of FIG. 2A. As illustrated in FIG. 2B, each client station 154 records the time $t_{1,k}$ at which the client station 154 began transmitting the particular portion of the UL NDP 224 (e.g., the first occurring HE-LTF in the UL NDP 224), and records the $AoD_{1,k}$ at which the UL NDP 224 left the antennas 178 of the client station 154. Additionally, the AP 114 records the time $t_{2,k}$ at which the AP 114 began receiving the particular portion (e.g., a first occurring HE-LTF) in each UL NDP 224, and the $AoA_{1,k}$ at which each UL NDP 224 arrived at the antennas 138 of the AP 114.

Referring now to FIGS. 2A and 2B, responsive to the UL MU transmission 220, the AP 114 begins transmitting a DL PPDU 228 that includes an NDP announcement (NDPA) frame a defined time period after an end of the UL MU transmission 220. In an embodiment, the defined time period is SIFS. In other embodiments, another suitable time period is utilized. The NDPA frame in the PPDU 228 is configured to cause the client stations 154 to be prepared to receive an NDP from the AP 114, according to an embodiment.

The AP 114 generates a DL PPDU 232 and begins transmitting the DL PPDU 232 a defined time period after an end of the DL PPDU 228. In an embodiment, the defined time period is SIFS. In other embodiments, another suitable time period is utilized. The DL PPDU 232 is a MU PPDU that includes DL NDPs 236 to respective client stations 154. In another embodiment, the AP 114 transmits a single DL NDP 236 using a SU DL transmission (e.g., with a broadcast destination address) to the client stations 154. The DL NDP(s) 236 include PHY preamble(s) having one or more STFs, one or more LTFs and one or more signal fields, in an embodiment. In an embodiment, the PHY preamble of the DL NDP 236 includes i) a legacy portion having an L-STF, an L-LTF, and an L-SIG, and ii) a non-legacy portion having an HE-STF, one or more HE-LTFs, and one or more HE-SIGs. The DL NDP(s) 236 omit data portions. In an embodiment, different DL NDPs 236 are transmitted in different frequency bandwidth portions (e.g., OFDMA). In some embodiments, two or more of the DL NDPs 236 are transmitted within a same frequency band (e.g., two or more of the DL NDPs 236 span the same frequency band) using different spatial streams (e.g., the two or more DL NDPs 236 are transmitted using MU-MIMO). In another embodiment, a single DL NDP 236 is broadcast to the client stations 154.

When transmitting the DL NDP(s) 236, the AP 114 records a time $t_{3,k}$ at which the AP 114 began transmitting a particular portion of the DL NDP(s) 236 (e.g., a first occurring HE-LTF in each DL NDP(s) 236). Similarly, when each client station 154 receives the corresponding DL NDP 236, the client station 154 records a time $t_{4,k}$ at which the client station 154 began receiving the particular portion of the DL NDP 236 (e.g., the first occurring HE-LTF in the DL NDP 236). As illustrated in FIG. 2B, the AP 114 records the time $t_{3,k}$ at which the AP 114 began transmitting the particular portion of the DL NDP 236 (e.g., the first occurring HE-LTF in the DL NDP 236), and the client station 154 records the time $t_{4,k}$ at which the client station 154 began receiving the particular portion of the DL NDP 236 (e.g., the first occurring HE-LTF in the DL NDP 236).

In some embodiments, when transmitting the DL NDP 236, the AP 114 records an $AOD_{2,k}$ at which the DL NDP 236 left the antennas 138 of the AP 114. Similarly, when the client station 154 receives the DL NDP 236, the client station 154 records an $AOA_{2,k}$ at which the DL NDP 236 arrived at the antennas 178 of the client station 154.

In some embodiments, the MU ranging measurement exchange 200 omits the DL PPDU 228. For example, the AP 114 begins transmitting the DL PPDU 232 a defined time period after an end of the UL MU transmission 220. In an embodiment, the defined time period is SIFS. In other embodiments, another suitable time period is utilized.

The DL FB exchange 210 includes a DL PPDU 240 (which may be a DL OFDMA transmission or a DL MU-MIMO transmission) having FB frames 244 for multiple client stations 154, e.g., STA1, STA2, STA3, and STA4. The FB frames 244 are illustrated in FIG. 2A as being transmitted in different frequency bandwidth portions. In some embodiments, two or more of the FB frames 244 are transmitted within a same frequency band (e.g., two or more of the FB frames 244 span the same frequency band) using different spatial streams (e.g., the two or more FB frames 244 are transmitted using MU-MIMO).

In some embodiments, the DL PPDU 240 is transmitted a defined time period after an end of the DL PPDU 232. In an embodiment, the defined time period is SIFS. In other embodiments, another suitable time period is utilized. In other embodiments, the DL PPDU 240 is transmitted after some delay. As discussed above, in some embodiments, the DL PPDU 240 is not transmitted within a same TXOP as the DL PPDU 232.

The FB frames 244 respectively include the recorded times $t_{2,k}$ and $t_{3,k}$. In some embodiments, each of one or more FB frames 244 respectively includes (optionally) the recorded angles $AoA_{1,k}$ and $AOD_{2,k}$. In some embodiments, the FB frames 244 optionally also include respective channel estimate information determined by the AP 114 based on reception of the UL NDPs 224.

After receipt of the FB frames 244, one or more of the client stations 154 respectively calculate one or more respective of times-of-flight between the AP 114 and the one or more client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, one or more of the client stations 154 calculates estimated positions of one or more of the client stations using the calculated times-of-flight. For example, the client station 154-1 uses triangulation techniques to calculate an estimated positions of the client station 154-1 using the calculated time-of-flight. In some embodiments, the client station 154-1 calculates an estimated position of the client station also using the recorded angles $AoD_{1,k}$, $AoA_{1,k}$, $AOD_{2,k}$, and $AOA_{2,k}$. For example, the recorded angles $AoD_{1,k}$, $AoA_{1,k}$, $AOD_{2,k}$, and $AOA_{2,k}$ are used as part of a triangulation algorithm for determining a position of the client station 154-1.

Responsive to receipt of the FB frames 244, the client stations 154 generate an UL MU transmission 250 (which may be an UL OFDMA transmission or an UL MU MIMO transmission) that includes respective ACK frames 254 from respective client stations, according to an embodiment. The client stations 154 transmit as part of the UL MU transmission 250 a defined time period after an end of the DL transmission 240. In an embodiment, the defined time period is SIFS. In other embodiments, another suitable time period is utilized. The ACK frames 254 are illustrated in FIG. 2A as being transmitted in different frequency bandwidth portions. In some embodiments, two or more of the ACK frames 254 are transmitted within a same frequency band (e.g., two or more of the ACK frames 254 span the same frequency band) using different spatial streams (e.g., the two or more ACK frames 254 are transmitted using MU-MIMO). In some embodiments, the client stations 154 do not generate and transmit the UL MU transmission 250 (e.g., the client stations 154 do not generate and transmit the AC frames 254).

In an embodiment, the AP 114 transmits a DL PPDU 260 a defined time period after an end of the UL MU transmission 250. In an embodiment, the defined time period is SIFS. In other embodiments, another suitable time period is utilized. The PPDU 260 includes a trigger frame to cause the group of client stations 154 to simultaneously transmit, as part of an UL MU transmission 264, uplink PPDUs 268 that include ranging measurement feedback. The trigger frame in the PPDU 260 causes multiple client stations 154 to begin simultaneously transmitting the UL MU transmission 264 a defined time period after an end of the PPDU 260. In an embodiment, the defined time period is SIFS. In other embodiments, another suitable time period is utilized.

The UL MU transmission 264 (which may be an UL OFDMA transmission or an UL MU-MIMO transmission) includes UL PPDUs 268 from multiple client stations 154, e.g., STA1, STA2, STA3, and STA4. The UL PPDUs 268 are illustrated in FIG. 2A as being transmitted in different frequency bandwidth portions. In some embodiments, two or more of the UL PPDUs 268 are transmitted within a same frequency band (e.g., two or more of the UL PPDUs 268 span the same frequency band) using different spatial streams (e.g., the two or more UL PPDUs 268 are transmitted using MU-MIMO).

The UL PPDUs 268 correspond to uplink ranging measurement feedback packets. The PPDUs 268 respectively include the recorded times $t_{1,k}$ and $t_{4,k}$. In some embodiments, each of one or more PPDUs 268 respectively includes (optionally) the recorded angles $AoD_{1,k}$ and $AOA_{2,k}$. In some embodiments, the PPDUs 268 optionally also include respective channel estimate information determined by the client station 154 based on reception of the DL NDP 236.

After receipt of the PPDUs 268, the AP 114 calculates respective of times-of-flight between the AP 114 and the client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, the AP 114 calculates estimated positions of one or more of the client stations using the calculated times-of-flight. For example, the AP 114 uses triangulation techniques to calculate estimated positions of one or more of the client stations using the calculated times-of-flight. In some embodiments, the AP 114 calculates estimated positions of one or more of the client stations also using the recorded angles $AoD_{1,k}$, $AoA_{1,k}$, $AOD_{2,k}$, and $AOA_{2,k}$. For example, the recorded angles $AoD_{1,k}$, $AoA_{1,k}$, $AOD_{2,k}$, and $AOA_{2,k}$ are used as part of a triangulation algorithm for determining positions of communication devices.

In another embodiment, the order, in time, of the DL FB exchange 210 and the UL FB exchange 212 is reversed, and the UL FB exchange 212 occurs before the DL FB exchange 210. In some embodiments, the DL FB exchange 210 is omitted. In some embodiments, the UL FB exchange 212 is omitted.

Figure 3:
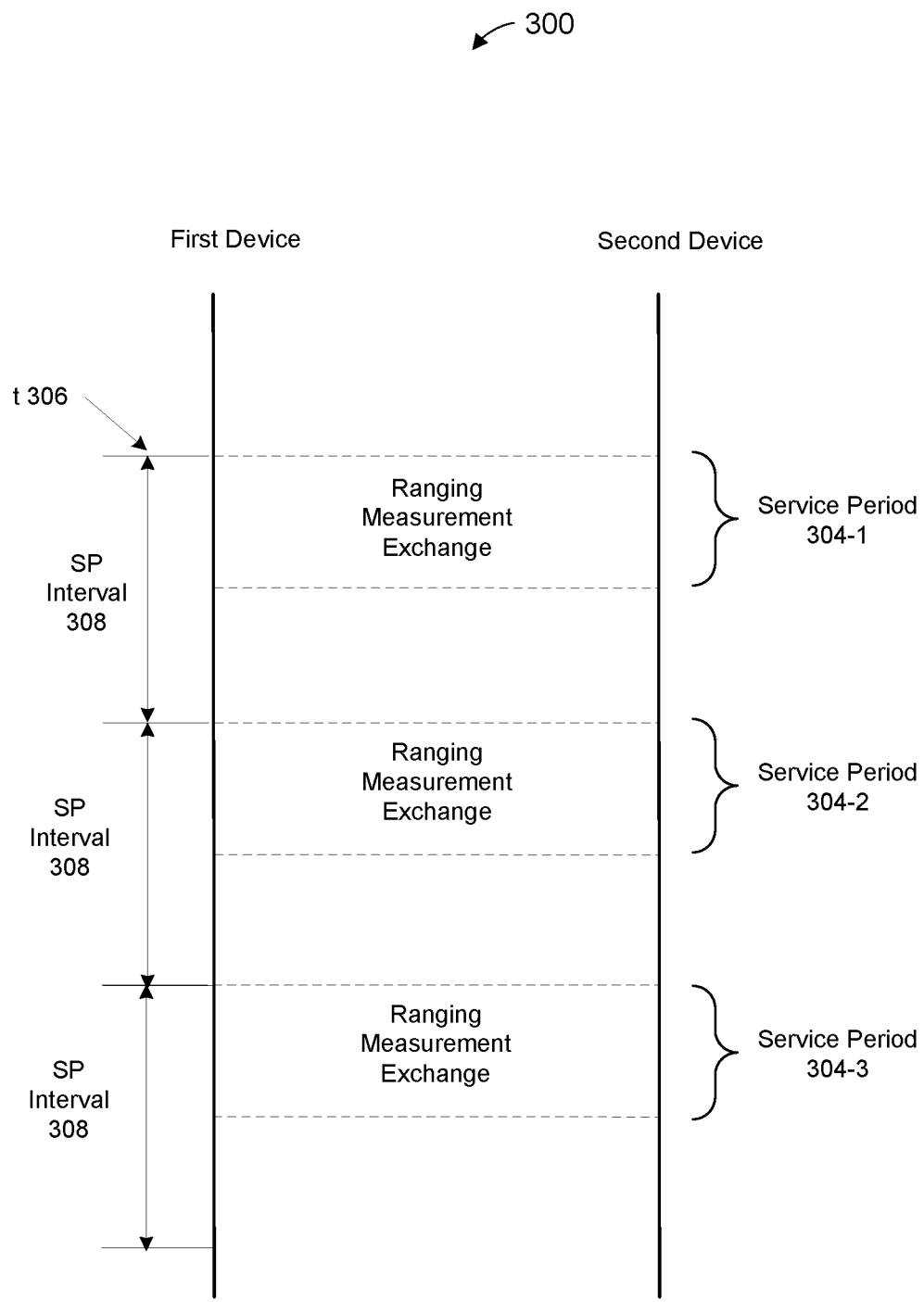
FIG. 3 is a timing diagram of an example MU ranging measurement procedure performed in the WLAN of FIG. 1, according to an embodiment.

FIG. 3 is a timing diagram of a ranging measurement procedure 300 conducted between a first communication device (e.g., AP 114) and a set of second communication devices (e.g., client stations 154), according to an embodiment. The diagram of FIG. 3 is described in the context of the example network 110 of FIG. 1 merely for explanatory purposes. In some embodiments, the ranging measurement procedure 300 in FIG. 3 is conducted by other suitable communication devices and/or in other suitable types of wireless networks.

The ranging measurement procedure 300 includes a plurality of SPs 304 for ranging measurement exchanges. In an embodiment, each SP 304 includes a respective instance of the MU ranging measurement exchange 200 of FIG. 2A. The first SP 304-1 of the ranging measurement procedure 300 begins at a time t 306, and the following SPs 304 of the ranging measurement procedure 300 occur at a time interval 308 from a beginning of the previous SP 304, in an embodiment. Although the ranging measurement procedure 300 is illustrated in FIG. 3 as including three SPs 304, the ranging measurement procedure 300 includes other suitable numbers (e.g., 2, 4, 5, 6, etc.) of SPs 304, in other embodiments. In an embodiment, prior to the beginning of the ranging measurement procedure 300 at the time t 306, the AP 114 indicates to a set of client stations 154 that the client stations 154 are to participate in the ranging measurement procedure 300. The AP 114 also indicates to the set of client stations 154 the time 306 at which the first SP 304-1 of the ranging measurement procedure will begin, and the time interval 308 at which the SPs 304 of the ranging measurement procedure 300 will occur. In time periods between the SPs 304, the client stations 154 are allowed to transmission into a sleep state, in an embodiment.

Figure 4:
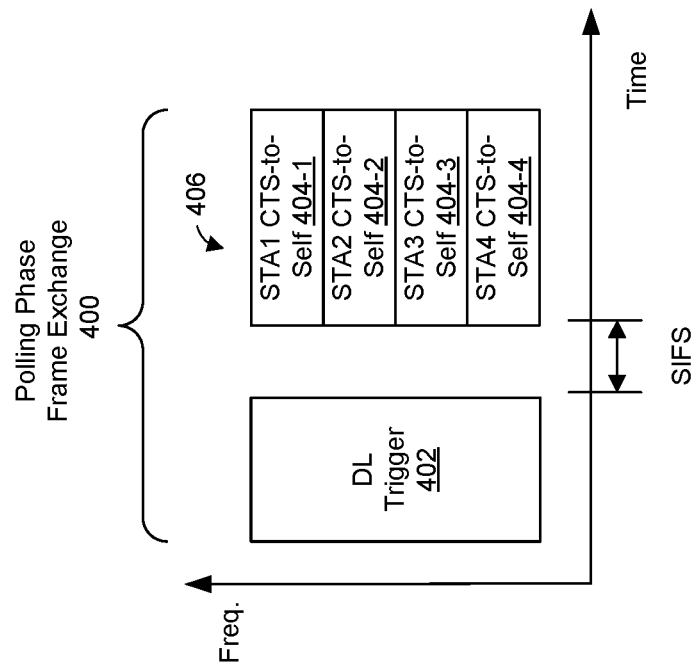
FIG. 4 is a diagram of an example polling phase frame exchange used with the MU ranging measurement procedure of FIG. 3, according to an embodiment.

FIG. 4 is a diagram of an example polling phase frame exchange 400, according to an embodiment. In an embodiment, the polling phase frame exchange 400 occurs at a beginning of each SP 304 in the MU ranging measurement procedure 300. The diagram of FIG. 4 is described in the context of the example network 110 of FIG. 1 merely for explanatory purposes. In some embodiments, signals illustrated in FIG. 4 are generated by other suitable communication devices and/or in other suitable types of wireless networks.

In the polling phase frame exchange 400, the AP 114 transmits a PPDU 402 to the set of client stations 154 that are scheduled to participate in the MU ranging measurement procedure 300. In an embodiment, the PPDU 402 includes a ranging trigger frame that prompts the set of client stations 154 to simultaneously transmit, as part of an uplink (UL) MU transmission 406 (which may be an UL orthogonal frequency division multiple access (OFDMA) transmission or an UL MU multiple input, multiple output (MIMO) transmission), PPDUs 404. In an embodiment, respective PPDUs 404 transmitted by the client stations 154 include respective clear to send (CTS) to self (CTS-to-self) frames. In an embodiment, prior to transmitting a PPDU 404 that includes a CTS-to-self frame, a client station 154 performs a media access procedure to ensure that its communication channel is not busy and available for transmission to/by the client station 154. After transmission of the PPDUs 404, the client stations 154, among the set of client stations 154, that are able to participate in the MU ranging measurement procedure 300 during the SP 304 are awake and ready for the SP 304, in an embodiment.

In an embodiment, the AP 114 is configured to provide, to the client stations 154, timing information that allows the client stations 154 to synchronize timing for ranging measurement with the AP 114. For example, the AP 114 and each client station 154 is configured to maintain a respective timing synchronization timer, such as timing synchronization function (TSF) timer, and the timing information allows each client station 154 to synchronize its TSF timer with the TSF timer of the AP 114. Ranging timing synchronization is performed in each SP 304, in an embodiment. In another embodiment, ranging timing synchronization is not performed in each SP 304. Based on the timing synchronization timer of a client station 154 synchronized with the timing synchronization timer of the AP 114 during an SP 304, the client station 154 is able to accurately determine beginning times of one or more following SPs 304, in an embodiment.

To perform ranging timing synchronization, the AP 114 records timing information corresponding to transmission of a first ranging frame during an SP 304. For example, the AP 114 records a value of its TSF timer at a time corresponding to transmission of the first ranging frame during the SP 304. In an embodiment, the first ranging frame is the ranging trigger frame included in the PPDU 402 transmitted during the SP 304. In another embodiment, the first ranging frame is another suitable ranging frame transmitted during the SP 304. In an embodiment, a client station 154 (e.g., the client station 154-1) that receives the first ranging frame during the SP 304 records timing information corresponding to receipt of the first ranging frame at the client station 154-1.

Subsequently, the AP 114 transmits a second ranging frame during the SP 304, where the second ranging frame includes the timing information corresponding to transmission of the first ranging frame by the AP 114. In an embodiment, the second ranging frame is the NDPA frame included in the PPDU 228 transmitted during the SP 304. In another embodiment, the second ranging frame is another suitable ranging frame transmitted during the SP 304. For example, the second ranging frame is an FB frame 244 transmitted to the client station 154-1 during the SP 304, in an embodiment. The client station 154-1 receives the second ranging frame and obtains, form the second ranging frame, the timing information corresponding to transmission of the first ranging frame by the AP 114. The client station 154-1 adjusts its TSF timer based on the timing information corresponding to transmission of the first ranging frame by the AP 114 and the timing information corresponding to receipt of the first ranging frame by the client station 154-1, in an embodiment.

Figure 5A:
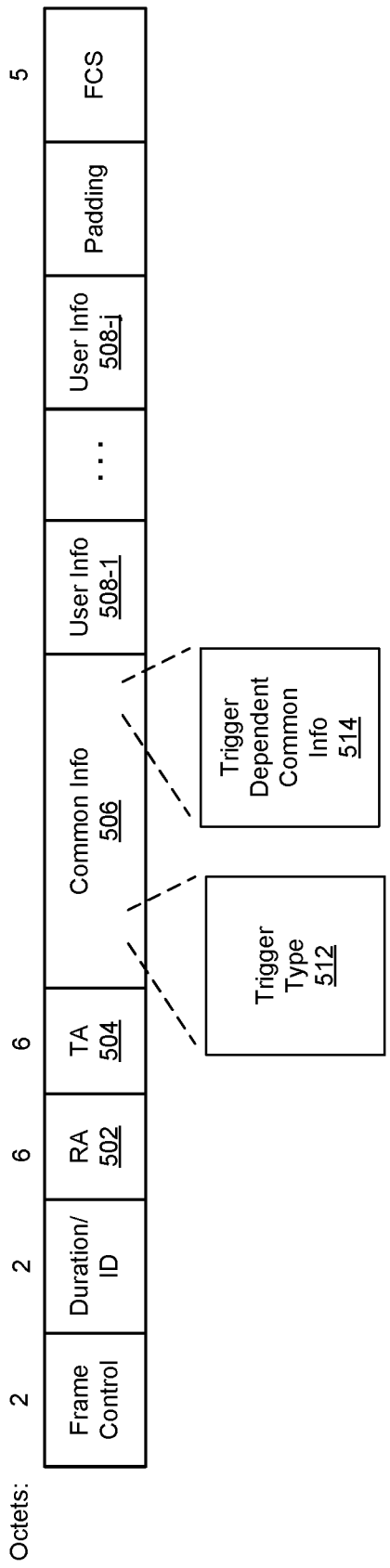
FIG. 5A is a diagram of an example trigger frame used with the polling phase frame exchange of FIG. 4, according to an embodiment.

FIG. 5A is a diagram of an example ranging trigger frame 500, according to an embodiment. In an embodiment, the ranging trigger frame 500 corresponds to the ranging trigger frame that is included in the PPDU 402 of FIG. 4. The diagram of FIG. 5A is described in the context of the example network 110 of FIG. 1 merely for explanatory purposes. In some embodiments, the trigger frame 500 illustrated in FIG. 5A are generated by other suitable communication devices and/or in other suitable types of wireless networks.

FIG. 5A includes example numbers of octets of various fields of the ranging trigger frame 500. In other embodiments, different suitable numbers of octets and bits are utilized. Fields in FIG. 5A that do not have an associated number of octets/bits are of a suitable length and/or a variable length. In some embodiment, one or more of the fields illustrated in FIG. 5A are omitted and/or one or more additional fields not illustrated in FIG. 5A are included.

The ranging trigger frame 500 includes a receiver address (RA) field 502 to indicate an intended receiver of the ranging trigger frame 500. The RA field 502 is set to a multicast address (e.g., a multicast MAC address) to specify the set of client stations 154 being prompted by the ranging trigger frame 500 or a broadcast address (e.g., a broadcast MAC address) to specify all client stations 154, in various embodiments. The ranging trigger frame 500 also includes a transmitter address (TA) field 504 to indicate the transmitter of the ranging trigger frame 500. The TA field 504 is set to a unicast address (e.g., a unicast MAC address) corresponding to the network interface 122 or the network interface 162, for example. The ranging trigger frame 500 also includes a common information field 506 to indicate common information for the set of client stations 154 being prompted by the ranging trigger frame 500, and one or more user information fields 508 to indicate user specific information for respective client stations 154 being prompted by the ranging trigger frame 500, in an embodiment.

Figure 5B:
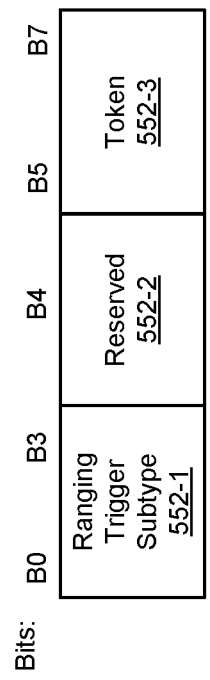
FIG. 5B is a diagram of an example trigger dependent common information subfield of the trigger frame of FIG. 5A, according to an embodiment.

The common information field 506 includes a trigger type subfield 512 and a trigger dependent common information subfield 514, in an embodiment. The trigger type subfield 512 is set to indicate that the ranging trigger frame 500 is of a ranging trigger type, in an embodiment. Content of the trigger dependent common information field 514 is interpreted based on the indication of the trigger type in the trigger type 512, in an embodiment. FIG. 5B is a diagram of an example trigger dependent common information subfield 550 that corresponds to the trigger dependent common information field 514 when the trigger type 512 indicates that the ranging trigger frame 500 is of a ranging trigger type, according to an embodiment.

In an embodiment, the trigger dependent common information subfield 550, itself, includes a plurality of subfields 552 including a ranging trigger subtype subfield 552-1, a reserved subfield 552-2 and a token subfield 552-3. FIG. 5B includes example bit allocations of the subfields 552. In other embodiments, different suitable bit allocations are utilized. In some embodiments, one or more of the subfields 552 illustrated in FIG. 5B are omitted, and/or one or more additional subfields are included.

The ranging trigger subtype 552-1 is set to indicate a subtype of the ranging trigger frame 500, in an embodiment. The ranging trigger subtype 552-1 is set to indicate that the ranging trigger frame 500 is of trigger poll subtype, in an embodiment. The token subfield 552-3 includes a value of a token identifying the particular ranging trigger frame 500 that includes the token subfield 552-3, in an embodiment. In an embodiment, the AP 114 maintains a trigger poll counter for setting the value of the token subfield 552-3 in ranging trigger frames of the trigger poll subtype. In an embodiment, before transmitting a ranging trigger frame of the trigger poll subtype, the AP 114 increments the value of the trigger poll counter by a predetermined amount. For example, the AP 114 increments the value of the trigger poll counter by one (modulo 16), in an embodiment. In another embodiment, the AP 114 increments the value of the trigger poll counter by another suitable amount. The AP 114 then sets the token subfield 552-3 in the ranging trigger frame to the incremented value of the trigger poll counter, in an embodiment. In other embodiments, the AP 114 uses other suitable methods of determining a value of the token subfield 552-3 to identify the particular ranging trigger frame 500 that includes the token subfield 552-3.

The token subfield 552-3 is included in the trigger dependent common information subfield 550 when the ranging trigger subtype 552-1 indicates that the ranging trigger frame 500 is a trigger poll frame, in an embodiment. When the ranging trigger subtype 552-1 indicates that the ranging trigger frame 500 is a trigger frame of a subtype other than a polling trigger frame, the token subfield 552-3 is reserved, in an embodiment.

In an embodiment, a client station 154 (e.g., the client station 154-1) receives the ranging trigger frame 500 and records timing information corresponding to receipt of the ranging trigger frame 500 at the client station 154-1. For example, the client station 154 records a value of its timing synchronization timer, such as TSF timer, at the time that the PPDU 402 is received by the client station 154-1, in an embodiment. In an embodiment, the client station 154-1 also records the value of the token subfield 552-3 in the ranging trigger frame 500. The client station 154-1 subsequently uses the recorded value of the token subfield 552-3 to determine that timing information obtained by the client station 154-1 from a subsequent ranging frame (e.g., the NDPA frame included in the PPDU 228) corresponds to transmission of the ranging trigger frame 500 by the AP 114, in an embodiment.

Figure 6A:
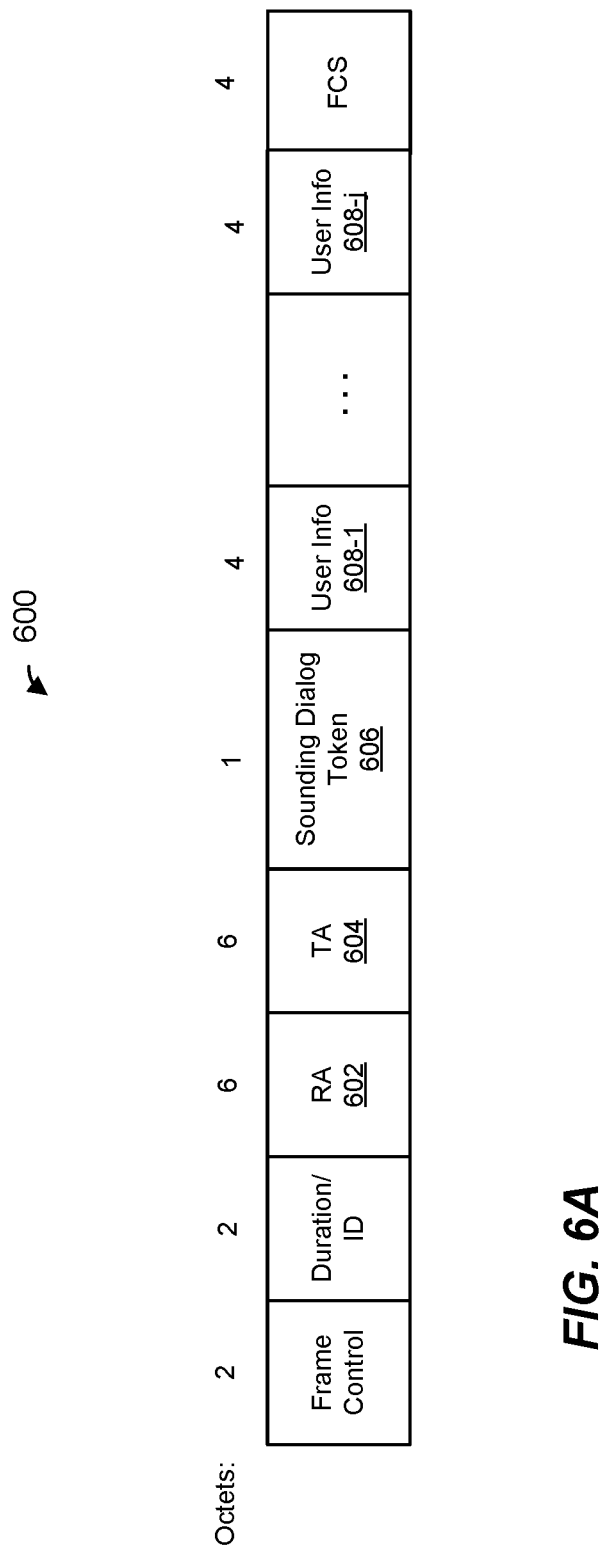
FIG. 6A is a diagram of an example null data packet announcement (NDPA) frame used with the MU ranging measurement procedure of FIG. 3, according to an embodiment.

FIG. 6A is a diagram of an example NDPA frame 600, according to an embodiment.

In an embodiment, the NDPA frame 600 corresponds to the NDPA frame that is included in the PPDU 228 of FIG. 2 transmitted during an SP 304 to the set of client stations 154 participating in the SP 304. In an embodiment, the AP 114 transmits the NDPA frame 600 in the same SP 304 as the PPDU 402 of FIG. 4. The diagram of FIG. 6A is described in the context of the example network 110 of FIG. 1 merely for explanatory purposes. In some embodiments, the NDPA frame 600 illustrated in FIG. 6A is generated by other suitable communication devices and/or in other suitable types of wireless networks.

FIG. 6A includes example numbers of octets of various fields of the NDPA frame 600. In other embodiments, different suitable numbers of octets and bits are utilized. Fields in FIG. 6A that do not have an associated number of octets/bits are of a suitable length and/or a variable length. In some embodiment, one or more of the fields illustrated in FIG. 6A are omitted and/or one or more additional fields not illustrated in FIG. 6A are included.

The NDPA frame 600 includes a receiver address (RA) field 602 to indicate an intended receiver of the NDPA frame 600. The RA field 602 is set to a multicast address (e.g., a multicast MAC address) to specify the set of client stations 154 being prompted by the NDPA frame 600 or a broadcast address (e.g., a broadcast MAC address) to specify all client stations 154, in various embodiments. The NDPA frame 600 also includes a transmitter address (TA) field 604 to indicate the transmitter of the NDPA frame 600. The TA field 604 can be set to a unicast address (e.g., a unicast MAC address) corresponding to the network interface 122 or the network interface 162, for example.

The NDPA frame 600 also includes a sounding token field 606. In an embodiment, the sounding token field 606 is used to indicate that the current frame exchange is for the purpose of ranging measurement, for example to distinguish the current frame exchange from a frame exchange for the purpose of channel measurement in a beamforming procedure. In an embodiment, a bit of the sounding token field 606 is set to a value of logic one (1) to indicate that the current frame change is for the purpose of ranging measurement. For example, bit 0 (B0) of the sounding token field 606 is set to a value of logic one (1) to indicate that the current frame change is for the purpose of ranging measurement. In another embodiment, another suitable bit of the sounding token field 606 is set to a value of logic one (1) to indicate that the current frame change is for the purpose of ranging measurement.

The NDPA frame 600 further includes one or more user information fields 608 respectively corresponding to respective client stations 154 among the set of client stations 154 being prompted by the NDPA frame 600. FIG. 6B is a diagram of a user information field 625 corresponding to a user field 608 of FIG. 6A, according to an embodiment. The user information field 625 includes a plurality of subfields 630, including an association identifier (AID) subfield 630-1, a partial BW information subfield 630, a feedback type and Ng subfield 630-3, a disambiguation subfield 630-4, a codebook subfield 630-5, and an Nc subfield 630-6. FIG. 6B includes example bit allocations in the subfields 630. In other embodiments, different suitable bit allocations are utilized. In some embodiments, one or more of the subfields 630 illustrated in FIG. 6B are omitted, and/or one or more additional subfields not illustrated in FIG. 6B are included.

The AID subfield 630-1 includes an identifier, such as an association identifier or a partial association identifier, of the second communication device for which the user information field 625 is intended. In an embodiment, if the second communication device for which the user information field 625 is intended is an unassociated client station, the AID subfield 630-1 includes a pre-assigned association identifier (pre-AID) previously provided to the second communication device (e.g., station 154) by the first communication device (e.g., the AP 114). In an embodiment, if the second communication device for which the user information field 608 is intended is an unassociated client station and a pre-AID has not been assigned, then the AID subfield 630-1 includes a MAC address of the second communication device, such as a 6-octet MAC address or a portion thereof. In other embodiments, other suitable identifiers are utilized.

The disambiguation subfield 630-4 is set to indicate a communication protocol to which the current ranging measurement procedure conforms. For example, the disambiguation subfield 630-4 is set to a value (e.g., a logic one (1)) that indicates that the current ranging measurement frame exchange conforms to a first communication protocol (e.g., IEEE 802.11ax) and not a second communication protocol (e.g., IEEE 802.11ac).

One or more of the subfields 630 illustrated in FIG. 6B correspond to subfields of an NDPA frame used, for example, in a beamforming sounding procedure, and these one or more subfields 630 may not be needed in the NDPA frame 600. The one or more subfields 630 that are not needed in the NDPA frame 600 are reserved in the NDPA frame 600, in an embodiment. For example, the partial BW information subfield 630-2 is reserved in the NDPA frame 600. In some embodiments, at least some of the one or more subfields 630 that are not needed in the NDPA frame 600 are omitted from the NDPA frame 600.

In an embodiment, one of the user information fields 608 in the NDPA frame 600 is used for providing timing information for ranging measurement timing synchronization. The one of the user information fields 608-1 in the NDPA frame 600 that is used for timing information for ranging measurement timing synchronization is the first user information field (the user information field 608-1 in FIG. 6A) in the NDPA frame 600 that precedes all of the other user information fields in the NDPA frame 600, in an embodiment. FIG. 6C is diagram of a user information field 635 used to provide timing information for ranging measurement timing synchronization, according to an embodiment. In an embodiment, the user information field 635 corresponds to a user information field 608 of FIG. 6A. For example, the user information field 635 corresponds to the user information field 608-1 of FIG. 6A, in an embodiment. In an embodiment, the user information field 635 is included in the NDPA frame 600 when the NDPA frame 600 is transmitted as part of a TB NDP ranging procedure, such as the ranging measurement procedure 300 of FIG. 3, and is omitted from the NDPA frame 600 when the NDPA frame is not part of a TB NDP ranging procedure.

The user information field 635 includes a plurality of subfields 630, including an AID subfield 640-1, a partial TSF subfield 640-2, a disambiguation subfield 640-3, a reserved subfield 640-4, and a token subfield 640-5. FIG. 6C includes example bit allocations in the subfields 640. At least some of the subfields 640 of the user information field 635 correspond to corresponding subfields 630 of the user information field 625 of FIG. 6B and/or are repurposed from the corresponding subfields 630 of the user information field 625 of FIG. 6B. For example, the AID field subfield 640-1 corresponds to the AID subfield 630-1 of the user information field 625 of FIG. 6B. Similarly, the disambiguation subfield 640-3 corresponds to the disambiguation subfield 630-4 of the user information field 625 of FIG. 6B, in an embodiment. The partial TSF subfield 640-3 corresponds to, collectively, the partial BW information subfield 630-2 and the Feedback Type and Ng subfield 630-2 of the user information field 625 of FIG. 6B, repurposed for indicating timing information in the user information field 635, in an embodiment. The reserved subfield 640-4 corresponds to the codebook size subfield 630-5 of the user information field 625, reserved in the user information field 635, in an embodiment. The token subfield 640-5 corresponds to the Nc subfield 630-6 of the user information field 625 repurposed as a token subfield in the user information field 635, in an embodiment. In other embodiments, different suitable bit allocations are utilized. In some embodiments, one or more of the subfields 640 illustrated in FIG. 6C are omitted, and/or one or more additional subfields not illustrated in FIG. 6C are included. Some of the subfields 640 of the user information field 635 are the same as corresponding subfields 630 of the user information field 625 of FIG. 6B, in an embodiment. For example, some of the subfields 640 correspond to subfields 630 that are repurposed from the corresponding subfields 630 of the user information field 625 of FIG. 6B, in an embodiment.

In an embodiment, the AID subfield 640-1 is set to a predetermined value to indicate that the user information field 635 used for providing ranging timing synchronization information. In an embodiment, the AID subfield 640-1 is set to 2044 to indicate that the user information field 635 used for providing timing information for ranging measurement timing synchronization. In another embodiment, the AID subfield 640-1 is set to another suitable predetermined value to indicate that the user information field 635 used for providing timing information for ranging measurement timing synchronization.

The partial TSF subfield 640-2 includes timing information corresponding to transmission of the PPDU 402 in the SP 304 during which the NDPA frame 600 is transmitted, in an embodiment. In an embodiment, the AP 114 determines the timing information as an adjusted value of the TSF timer as (a value of the TSF timer at a time that a first data symbol of a PSDU that includes the corresponding ranging trigger frame is transmitted from the MAC processor 126 to the PHY processor 130)+(a time delay through the PHY processor 130). In another embodiment, the AP 114 determines the timing information in another suitable manner.

In an embodiment, the partial TSF subfield 640-2 includes a subset of bits corresponding to the adjusted value of the TSF timer that the AP 114 recorded in connection with transmission of the PPDU 402. For example, the partial TSF subfield 640-2 includes a subset of least significant bits TSF[a+b:a], where a and b are integer bit indices, in an embodiment. As a more specific example, in an embodiment in which the adjusted value of the TSF timer is represented by 64 bits (bits TSF[63:0]), the partial TSF subfield 640-2 is set to a subset of least significant bits TSF [21:6] of the adjusted value of the TSF timer. In another embodiment, the partial TSF subfield 640-2 includes a different subset of bits corresponding to the adjusted value of the TSF timer.

The disambiguation subfield 640-3 is set to indicate a communication protocol to which the current ranging measurement procedure conforms, in an embodiment. For example, the disambiguation subfield 640-3 is set to a value (e.g., a logic one (1)) that indicates that the current NDP ranging measurement frame exchange conforms to a first communication protocol (e.g., IEEE 802.11ax) and not a second communication protocol (e.g., IEEE 802.11ac).

The reserved subfield 640-4 corresponds to the codebook size subfield 630-5 of the user information field 625 and is reserved in the user information field 635, in an embodiment.

The token subfield 630-6 includes a value of a token identifying the ranging trigger frame to transmission of which the timing information included in the partial TSF subfield 640-2 corresponds, in an embodiment. In an embodiment, the token subfield 640-5 is set to the same value as the value of a token subfield (e.g., the token subfield 552-3 in FIG. 5) in the ranging trigger frame in the PPDU 402 transmitted in the SP 304 during which the NDPA frame 600 is transmitted.

In an embodiment, a client station 154 (e.g., the client station 154-1) that receives the user information field 635 in an NDPA frame from the AP 114 determines, based on the value of the AID subfield 640-1 of the user information field 635 that the user information field 635 includes timing information for ranging measurement timing synchronization, and processes the partial TSF subfield 640-2 of the user information field 635 to obtain the timing information. Based on the timing information obtained from the partial TSF subfield 640-2 of the user information field 635, the client station 154-1 adjusts the recorded value of TSF timer of the client station 154-1 corresponding to receipt of the corresponding ranging trigger frame at the client station 154-1, in an embodiment. In an embodiment, the client station 154-1 determines an arithmetic difference between the recorded value of TSF timer of the client station 154-1 and value of the TSF timer of the AP 114 indicated by the timing information obtained by the client station 154-1 from the obtained from the partial TSF subfield 640-2 of the user information field 635, and adjusts the recorded value of TSF timer of the client station 154-1 based on the determined arithmetic difference. In an embodiment, prior to adjusting the TSF timer of the client station 154-1, the client station 154-1 checks whether the value of the most significant bits [63:a+b+1] (e.g., bits [63:22] in the example discussed above) of the TSF timer needs to be adjusted to correspond with bits 63:22 of the TSF timer of the AP 114. In an embodiment, the client station 154-1 the client station 154-1 increases the value of value of bits [63:a+b+1] (e.g., bits [63:22]) of its TSF timer by 1 if i) the value of the bits [a+b:a] (e.g., bits [21:6] in the example above) of the TSF timer recorded at the client station 154-1 is greater than the value of the bits 21:6 of the TSF timer obtained from the partial TSF subfield 640-2 and ii) the value of the bits 21:6 of the TSF timer obtained from the partial TSF subfield 640-2 is greater than $2a^{+b-1}$ (e.g., $2^{16-1}$ in the example above). On the other hand, the client station 154-1 decreases the value of value of bits [63:a+b+1] (e.g., bits [63:22]) of its TSF timer by 1 if i) the value of the bits 21:6 of the TSF timer recorded at the client station 154-1 is less than the value of the bits 21:6 of the TSF timer obtained from the partial TSF subfield 640-2 and ii) (the value of the bits 21:6 of the TSF timer obtained from the partial TSF subfield 640-2)−(the value of the bits 21:6 of the TSF timer recorded at the client station 154-1) is greater than $2^{a+b-1}$ (e.g., $2^{16-1}$ in the example above), in an embodiment.

In an embodiment, in addition to adjusting the value of the most significant bits (e.g., bits [63:22] in the example above] of the TSF timer (if needed) as described above, the client station 154-1 sets the value of the subset of least significant bits (e.g., bits [21:6] in the example above) of the TSF timer to the value of the sum of the value obtained from the partial TSF subfield 640-2 and the value of a time difference between the time of reception of the corresponding ranging trigger frame and the reception of the NDPA frame that includes the user information field 635. In an embodiment, the client station 154-1 additionally increments the value of bits 63:22 of the TSF timer by 1 if the value of the sum of the value obtained from the partial TSF subfield 640-2 and the value of a time difference between the time of reception of the corresponding ranging trigger frame and the reception of the NDPA frame that includes the user information field 635 is greater than $2^{22}$, in an embodiment.

Figure 7:
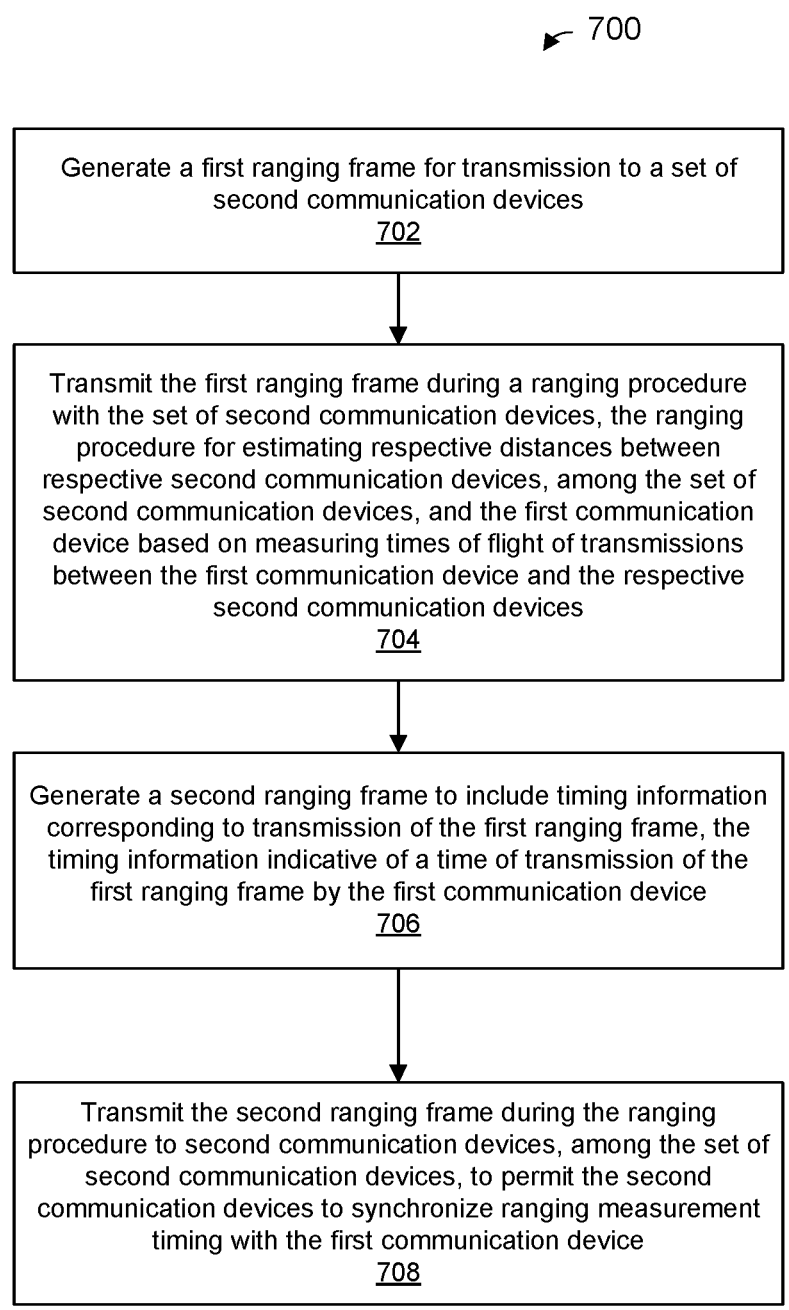
FIG. 7 is a flow diagram of an example method for performing time synchronization for MU ranging measurements in the WLAN of FIG. 1, according to an embodiment.

FIG. 7 is a flow diagram of an example method 700 for performing time synchronization for MU ranging measurements in a WLAN, according to an embodiment. In some embodiments, the network interface device 162 of FIG. 1 is configured to implement the method 700. The method 700 is described in the context of the network interface device 162 merely for explanatory purposes and, in other embodiments, the method 700 is implemented by another suitable device. For instance, in an embodiment, the network interface device 122 of FIG. 1, or another suitable WLAN network interface device is configured to implement the method 700.

At block 702, a first communication device (e.g., the network interface device 162) generates a first ranging frame for transmission to a set of second communication devices. In an embodiment, the first communication device generates a ranging trigger frame, such as the ranging trigger frame in the PPDU 402 of FIG. 4, the ranging trigger frame 500 of FIG. 5, etc. In an embodiment, the first communication device generates a ranging trigger frame of polling trigger subtype. In another embodiment, the first communication device generates another suitable first ranging frame.

At block 704, the first communication device transmits the first ranging frame during an MU ranging measurement procedure. In an embodiment, the MU ranging measurement procedure for estimating respective distances between respective second communication devices, among the set of second communication devices, and the first communication device based on measuring times of flight of transmissions between the first communication device and the respective second communication devices. In an embodiment, the first communication device transmits the first ranging frame during the MU ranging measurement procedure 300 of FIG. 3. For example, the communication device transmits the first ranging frame during an SP 304 of the MU ranging measurement procedure 300 of FIG. 3. In another embodiment, the first communication device transmits the first ranging frame during a suitable ranging measurement procedure different from the MU ranging measurement procedure 300 of FIG. 3.

At block 706, the first communication device generates a second ranging frame to include timing information corresponding to transmission of the first ranging frame. In an embodiment, the timing information indicative of a time of transmission of the first ranging frame by the first communication device. In an embodiment, the first communication device generates the NDPA frame 228 of FIG. 2 to include the timing information. In an embodiment, the first communication device generates the NDPA frame 600 of FIG. 6. In another embodiment, the first communication device generates another suitable second ranging frame.

At block 708, the first communication device transmits the second ranging frame during the MU ranging measurement procedure to second communication devices among the set of second communication devices. In an embodiment, the timing information included in the second ranging frame allows the second communication devices to synchronize ranging measurement timing with the first communication device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for performing time synchronization for multi-user (MU) ranging measurements in a wireless local area network (WLAN), the method comprising:

generating, at a first communication device, a trigger poll frame configured to poll a set of second communication devices for a respective clear-to-send (CTS) to self frame for channel availability during a service period (SP) prior to performing a MU ranging measurement procedure;

receiving the respective CTS to self frame for channel availability from the set of second communication devices;

generating, at the first communication device, a first ranging frame for transmission to the set of second communication devices based on the received respective CTS to self frame for channel availability from the set of second communication devices;

transmitting, by the first communication device, the first ranging frame during the SP of an MU ranging measurement procedure, the MU ranging measurement procedure for estimating respective distances between respective second communication devices, among the set of second communication devices, and the first communication device based on measuring times of flight of transmissions between the first communication device and the respective second communication devices;

generating, at the first communication device, a second ranging frame to include timing information corresponding to transmission of the first ranging frame, the timing information indicative of a time of transmission of the first ranging frame by the first communication device; and transmitting, by the first communication device, the second ranging frame during the SP of the MU ranging measurement procedure to second communication devices, among the set of second communication devices, to permit the second communication devices to synchronize ranging measurement timing with the first communication device.

2. The method of claim 1, wherein
transmitting the first ranging frame comprises transmitting the first ranging frame at a beginning of the SP.

3. The method of claim 2, wherein
generating the second ranging frame comprises generating an NDP announcement (NDPA) frame, and
transmitting the second ranging frame comprises transmitting the NDPA to the set of second communication devices subsequent to transmission of the trigger poll frame during the SP.

4. The method of claim 3, wherein the NDPA frame comprises a sounding token field to indicate that the NDPA is associated with the MU ranging measurement procedure and not a beamforming procedure.

5. The method of claim 1, wherein generating the first ranging frame comprises generating the first ranging frame to further include a token identifying the first ranging frame, wherein a value of the token corresponds to a value of a ranging frame counter maintained at the first communication device.

6. The method of claim 5, wherein generating the second ranging frame comprises generating the second ranging frame to further include the token identifying the first ranging frame to indicate to second communication devices, among the set of second communication devices, that the second ranging frame includes the timing information corresponding to transmission of the first ranging frame.

7. The method of claim 1, further comprising
maintaining, at the first communication device, a timing synchronization function (TSF) timer, wherein a value of the TSF timer is represented by a plurality of bits, and
recoding, at the first communication device, a TSF timer value corresponding to the time of transmission of the first ranging frame.

8. The method of claim 7, wherein generating the second ranging frame to include the timing information corresponding to transmission of the first ranging frame comprises generating the second ranging frame to include a partial TSF timer value including a subset of the plurality of bits of the TSF timer value recorded at the first communication device.

9. The method of claim 1, wherein
the method further comprises generating a plurality of user information fields to be included in the second ranging frame, including generating a first user information field, among the plurality of user information fields, to include the timing information, and
generating the second ranging frame comprises generating the second ranging frame to include the plurality of user information fields.

10. The method of claim 9, wherein generating the first user information field comprises generating the first user information field to further include a predetermined value in a user identifier subfield of the first user information field, the predetermined value indicating that the first user information field includes the timing information.

11. The method of claim 9, wherein generating the second ranging frame to include the plurality of user information fields comprises generating the second ranging frame such that the first user information field is transmitted before any other user information fields among the plurality of user information fields.

12. An apparatus, comprising:
a network interface device associated with a first communication device, wherein the network interface device includes one or more integrated circuit (IC) devices, and wherein the one or more IC devices are configured to:
generate a trigger poll frame configured to poll a set of second communication devices for a respective clear-to-send (CTS) to self frame for channel availability during a service period (SP) prior to performing a multi-user (MU) ranging measurement procedure;
receive the respective CTS to self frame for channel availability from the set of second communication devices;
generate a first ranging frame for transmission to the set of second communication devices based on the received respective CTS to self frame for channel availability from the set of second communication devices;
transmit the first ranging frame during the SP of the multi-user (MU) ranging measurement procedure, the MU ranging measurement procedure for estimating respective distances between respective second communication devices, among the set of second communication devices, and the first communication device based on measuring times of flight of transmissions between the first communication device and the respective second communication devices;
generate a second ranging frame to include timing information corresponding to transmission of the first ranging frame, the timing information indicative of a time of transmission of the first ranging frame by the first communication device; and
transmit the second ranging frame during the SP of the MU ranging measurement procedure to second communication devices, among the set of second communication devices, to permit the second communication devices to synchronize ranging measurement timing with the first communication device.

13. The apparatus of claim 12, wherein the one or more IC devices are configured to:
transmit the trigger poll frame at a beginning of the SP.

14. The apparatus of claim 13, wherein the one or more IC devices are configured to:
generating the second ranging frame at least by generating an NDP announcement (NDPA) frame, and
transmit the NDPA frame to the set of second communication devices subsequent to transmission of the trigger poll frame during the SP.

15. The apparatus of claim 14, wherein the NDPA frame comprises a sounding token field to indicate that the NDPA is associated with the MU ranging measurement procedure and not a beamforming procedure.

16. The apparatus of claim 12, wherein the one or more IC devices are configured to generate the first ranging frame to further include a token identifying the first ranging frame, wherein a value of the token corresponds to a value of a ranging frame counter maintained at the first communication device.

17. The apparatus of claim 16, wherein the one or more IC devices are configured to generate the second ranging frame to further include the token identifying the first ranging frame to indicate to the second communication devices, among the set of second communication device, that the second ranging frame includes the timing information corresponding to transmission of the first ranging frame.

18. The apparatus of claim 12, wherein the one or more IC devices are configured to:
maintain a timing synchronization function (TSF) timer, wherein a value of the TSF timer is represented by a plurality of bits, and
record a TSF timer value corresponding to the time of transmission of the first ranging frame.

19. The apparatus of claim 12, wherein the one or more IC devices are configured to generate the second ranging frame to include a partial TSF timer value including a subset of the plurality of bits of the TSF timer value recorded at the first communication device.

20. The apparatus of claim 12, wherein the one or more IC devices are further configured to:
generate a plurality of user information fields to be included in the second ranging frame, including generating a first user information field, among the plurality of user information fields, to include the timing information, and
generate the second ranging frame to include the plurality of user information fields.

21. The apparatus of claim 20, wherein the one or more IC devices are configured to generate the first user information field to further include a predetermined value in a user identifier subfield of the first user information field, the predetermined value indicating that the first user information field includes the timing information.

22. The apparatus of claim 20, wherein the one or more IC devices are configured to generate the second ranging frame such that the first user information field is transmitted before any other user information fields among the plurality of user information fields.

* * * * *